US011955101B2

United States Patent

(12) United States Patent
Ogawa

(10) Patent No.: US 11,955,101 B2
(45) Date of Patent: Apr. 9, 2024

(54) DISPLAY CONTROL DEVICE AND DISPLAY CONTROL METHOD

(71) Applicant: RENESAS ELECTRONICS CORPORATION, Tokyo (JP)

(72) Inventor: Yoshihito Ogawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/872,503

(22) Filed: Jul. 25, 2022

(65) Prior Publication Data

US 2023/0076798 A1 Mar. 9, 2023

(30) Foreign Application Priority Data

Sep. 7, 2021 (JP) ................................ 2021-145273

(51) Int. Cl.
*G09G 5/36* (2006.01)

(52) U.S. Cl.
CPC ......... *G09G 5/363* (2013.01); *G09G 2354/00* (2013.01); *G09G 2370/16* (2013.01); *G09G 2380/10* (2013.01)

(58) Field of Classification Search
CPC ............... G09G 5/363; G09G 2354/00; G09G 2370/16; G09G 2380/10
See application file for complete search history.

(56) References Cited

U.S. PATENT DOCUMENTS

2009/0298435 A1* 12/2009 Lee ..................... H04W 72/541 455/63.1
2010/0138780 A1* 6/2010 Marano ................... G06F 9/452 715/781
2015/0113425 A1* 4/2015 Noh ........................ G06F 3/038 715/740
2022/0125409 A1* 4/2022 Hattori ................... A61B 8/465

FOREIGN PATENT DOCUMENTS

JP 2006-217105 A 8/2006
JP 2008-016988 A 1/2008

* cited by examiner

*Primary Examiner* — Sahlu Okebato
(74) *Attorney, Agent, or Firm* — Rimon P.C.

(57) ABSTRACT

A display control device and a display control method capable of displaying a desired image regardless of a state of wireless communication are provided. A wireless control unit causes an external apparatus to draw a first image in accordance with input information. A first unit acquires the first image via the wireless communication and displays the first image on a display apparatus. A second unit causes a GPU to draw a second image in accordance with the unput information and displays the second image on the display apparatus. A switching unit determines whether a received radio wave is in a good state or a bad state, select the first unit when a determination result is that the received radio wave is in the good state, and select the second unit when the determination result is that the received radio wave is in the bad state.

8 Claims, 7 Drawing Sheets

DISPLAY CONTROL DEVICE AND DISPLAY CONTROL METHOD

CROSS-REFERENCE TO RELATED APPLICATIONS

The disclosure of Japanese Patent Application No. 2021-145273 filed on Sep. 7, 2021, including the specification, drawings and abstract is incorporated herein by reference in its entirety.

BACKGROUND

The present disclosure relates to a display control device and a display control method.

There are disclosed techniques listed below.

[Patent Document 1] Japanese Unexamined Patent Application Publication No. 2008-16988

[Patent Document 2] Japanese Unexamined Patent Application Publication No. 2006-217105

Patent Document 1 discloses an information provision and distribution server capable of providing service information accompanying a narrower position to a request terminal. Specifically, the information provision and distribution server extracts mobile terminals in the first area based on base station information of a plurality of mobile terminals, and determines a mobile terminal in the second area narrower than the first area as a target terminal based on GPS information of the extracted mobile terminals. The information provision and distribution server transmits the provision information from this target terminal to the request terminal.

Patent Document 2 discloses a mobile communication system capable of displaying information on a position with a small delay. Specifically, the mobile communication system includes a mobile communication terminal and a content distribution server. The content distribution server stores a plurality of content information related to a plurality of communication areas. The mobile communication terminal acquires content information related to the communication area of the switching destination from the content distribution server according to the switching of the communication area and displays content information based on the position of the own terminal from the content information acquired from the content distribution server.

SUMMARY

Recently, a connected car which can acquire various kinds of information from a server apparatus on a network by wireless communication is spreading. In particular, a display control device mounted on such a vehicle is required to execute more complicated graphics drawing processing. However, if the graphics drawing processing is complicated, the power consumption may increase. Increased power consumption is not particularly preferred in vehicles such as electric vehicles.

On the other hand, the communication speed of the wireless communication is expected to increase gradually. Therefore, a system in which the graphics drawing processing is carried on the server apparatus instead of the display control device may be considered. However, wireless communication is not always stable.

Other objects and novel features will be apparent from the description of this specification and the accompanying drawings.

A display control device according to one embodiment performs wireless communication with an external apparatus, displays an image in accordance with input information on a display apparatus, and includes a wireless control unit, first and second units, and a switching unit. The wireless control unit transmits causes the external apparatus to draw a first image in accordance with the input information by transmitting the input information to the external apparatus via the wireless communication. The first unit acquires the first image drawn by the external apparatus via the wireless communication and displays the first image on the display apparatus. The second unit includes a GPU, causes the GPU to draw a second image in accordance with the input information, and displays the second image drawn by the GPU on the display apparatus. The switching unit determines whether a received radio wave is in a good state or a bad state, select the first unit when a determination result is that the received radio wave is in the good state, and select the second unit when the determination result is that the received radio wave is in the bad state.

According to the above embodiment, it is possible to display a desired image regardless of the state of wireless communication.

DETAILED DESCRIPTION

Figure 1:
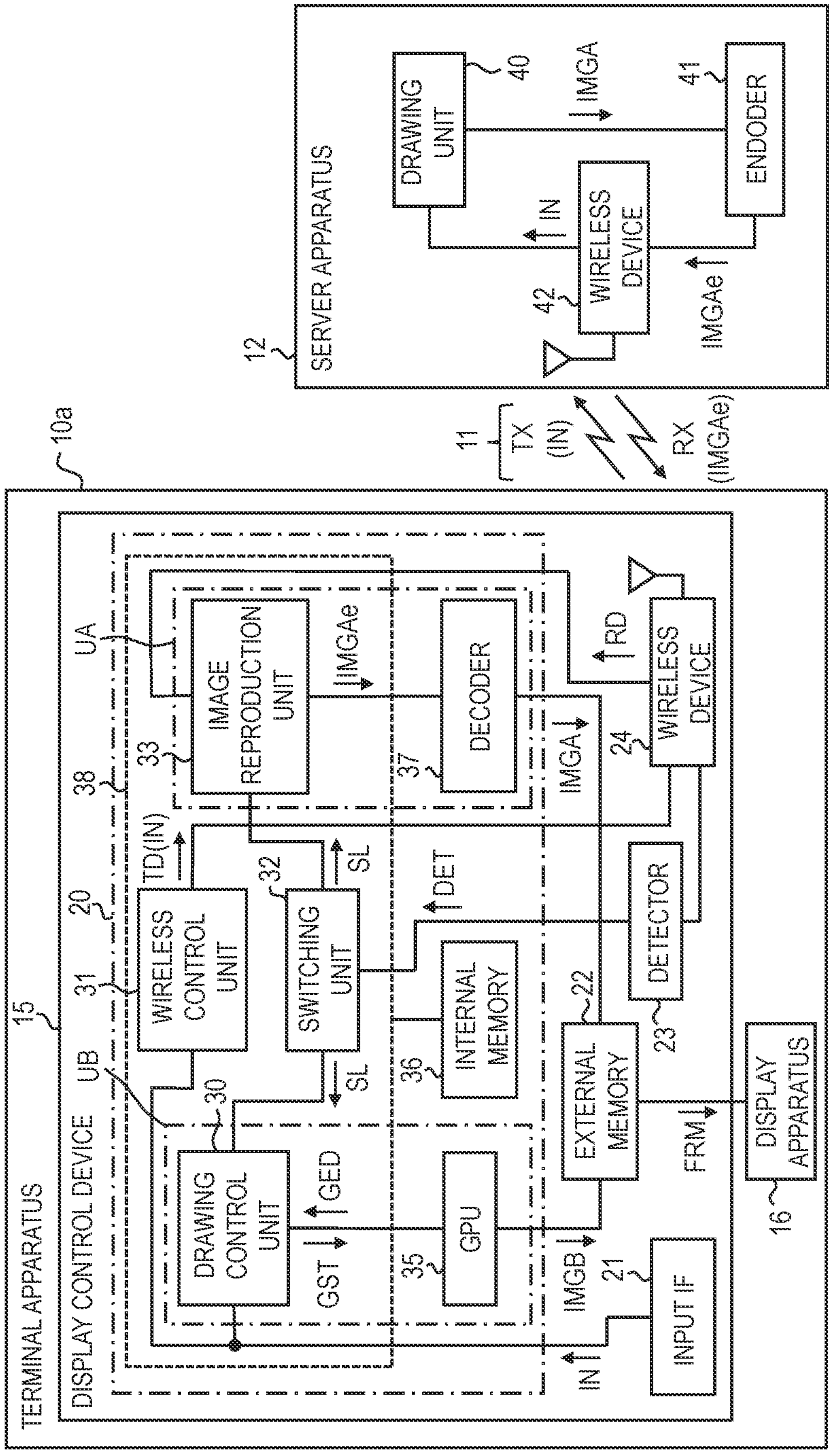
FIG. 1 is a schematic diagram showing a configuration example of a main part of an information processing system according to the first embodiment.

In the following embodiments, when necessary for convenience, the description will be made by dividing into a plurality of sections or embodiments, but except when specifically stated, they are not independent of each other, and one is related to the modified example, detail, supplementary description, or the like of part or all of the other. Further, in the following embodiments, when the number of elements etc. (including the number, numerical value, quantity, range, etc.) is referred to, except the case where it is specified in particular or the case where it is obviously limited to the specific number in principle, the number is not limited to the specific number, and may be more than or less than the specific number.

Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

Hereinafter, embodiments of the present invention are described in detail with reference to the drawings. In all the drawings for explaining the embodiments, the same members are denoted by the same reference numerals in principle, and repetitive descriptions thereof are omitted.

First Embodiment (Outline of Information Processing System)

FIG. 1 is a schematic diagram showing a configuration example of a main part of an information processing system according to the first embodiment. The information processing system shown in FIG. 1 is, for example, a system for a vehicle. The information processing system includes a terminal apparatus 10*a*, a server apparatus 12, and a wireless network 11 that connects the terminal apparatus 10*a* and the server apparatus 12. The terminal apparatus 10*a* is, for example, a mobile communication apparatus or the like mounted on a vehicle.

The terminal apparatus 10*a* includes a display control device 15, and a display apparatus 16. The display control device 15 is, for example, configured by a wiring board or the like in which various components are mounted. The display control device 15 performs wireless communication with the server apparatus 12, which is an external apparatus, and has a function of displaying an image in accordance with input information IN on the display apparatus 16. The display apparatus 16 is, for example, a liquid crystal display, an organic Electro Luminescence (EL) display or the like.

The display control device 15 includes a semiconductor device 20, an input interface 21, an external memory 22, a detector 23, and a wireless device 24. The input interface 21 receives an input from a user via a touch panel, operation buttons, a microphone for voice input (not shown), or the like. Further, the input interface 21 receives an input from a sensor (not shown) for acquiring various vehicle information.

For example, when the input interface 21 receives an input from a user, the input interface 21 generates information of the input, vehicle information related to the input, and the like as input information IN. When various events occur, the input interface 21 generates related vehicle information and the like as input information IN. Input information IN is information necessary for drawing an image. The external memory 22 is, for example, a Dynamic Random Access Memory (DRAM). The external memory 22 is a frame memory, and stores frame data FRM corresponding to an image displayed by the display apparatus 16.

The wireless device 24 performs wireless communication with the server apparatus 12 using a transmitted radio wave TX or a received radio wave RX. The wireless device 24 is configured by, for example, an analog front-end IC responsible for modulation processing and demodulation processing, a power amplifier used during transmission of the transmitted radio wave TX, or the like. The detector 23 detects the state of the received radio wave RX, and outputs the detection result as a detection signal DET. The detector 23 typically detects the intensity of the received radio wave RX. In this case, a radio wave intensity detection circuit or the like generally mounted on many wireless devices 24 may be used as the detector 23. It is noted that the detector 23 may not only detect the intensity of the received radio wave RX, but may also detect, for example, the error rate, and the like at the time of reception obtained from the error detection code or the like.

The semiconductor device 20 is, for example, a System on Chip (SoC) or the like configured by one semiconductor chip. The semiconductor device 20 includes two units UA, UB, a wireless control unit 31, a switching unit 32, and an internal memory 36. The internal memory 36 may be configured by, for example, a DRAM, or a Static Random Access Memory (SRAM), or a combination thereof.

The wireless control unit 31 inputs the input information IN from the input interface 21 and causes the sever apparatus 12 to draw an image IMGA in accordance with the input information by transmitting the input information to the sever apparatus 12 via wireless communication, that is, the wireless device 24. Specifically, the wireless control unit 31 inputs the input information IN, generates transmission data TD including the input information IN, and outputs the transmission data TD to the wireless device 24. The wireless device 24 transmits transmitted radio wave TX including the transmission data TD, and thus the input information, to the server apparatus 12, by modulating the transmission data TD from the wireless control unit 31.

The unit UA has a function of acquiring the image IMGA drawn by the server apparatus 12, in particular, the encoded image IMGAe via the wireless communication, that is, the wireless device 24, and displaying the acquired image IMGA on the display apparatus 16. That is, the unit UA displays the image IMGA on the display apparatus 16 by storing the image IMGA drawn by the server apparatus 12 in the external memory 22 which is the frame memory.

Specifically, the unit UA includes an image reproduction unit 33 and a decoder 37. The image reproduction unit 33 acquires the encoded image IMGAe after being drawn by the server apparatus 12 via wireless communication, that is, the wireless device 24. More specifically, the wireless device 24 receives received radio wave RX including the encoded image IMGAe from the server apparatus 12 in response to the transmission of the transmitted radio wave TX. The wireless device 24 demodulates the received radio wave RX to output reception data RD. The image reproduction unit 33 receives the reception data RD from the wireless device 24 and acquires the encoded image IMGAe included in the reception data RD.

Based on an instruction from the image reproduction unit 33, the decoder 37 decodes the image acquired by the image reproduction unit 33, that is, the image IMGAe encoded by the server apparatus 12 to restore the original image IMGA. The decoder 37 stores the restored image IMGA in the external memory 22. The decoder 37 is typically an MPEG decoder, a JPEG decoder, or the like.

On the other hand, the unit UB has a function of causing a Graphics Processing Unit (GPU) 35 to draw an image IMGB in accordance with the input information IN and displaying the image IMGB drawn by the GPU 35 on the display apparatus 16. That is, the unit UB displays the image IMGB on the display apparatus 16 by storing the image IMGB drawn by the GPU 35 in the external memory 22 which is the frame memory. Although the external memory 22 provided outside the semiconductor device 20 is used as the frame memory in this example, an internal memory 36 provided inside the semiconductor device 20 may be used instead.

In detail, the unit UB includes a drawing control unit 30 and the GPU 35. The drawing control unit 30 receives input information IN from the input interface 21 and outputs a drawing start instruction GST based on the input information IN. The GPU 35 draws the image IMGB (that is, the image IMGB in accordance with the input information IN) in response to the drawing start instruction GST from the drawing control unit 30. The GPU 35 stores the drawn image IMGB in the external memory 22. Further the GPU 35 outputs a drawing end notification GED to the drawing control unit 30 when the drawing of the image IMGB is completed.

The switching unit 32 determines whether the received radio wave is in a good state or a bad state, selects the unit UA when the determination result that the received radio wave is in the good state, and selects the unit UB when the determination result is that the received radio wave is in the bad state. Specifically, the switching unit 32, based on a detection signal DET from the detector 23, determines whether the received radio wave is in the good state or in the bad state. For example, the switching unit 32 determines that the received radio wave is in a good state when the intensity of the received radio wave RX is higher than a threshold value or when the error rate is lower than a threshold value. On the other hand, the switching unit 32 determines that the received radio wave is in the bad state when the intensity of the received radio wave RX is lower than a threshold value or when the error rate is higher than a threshold value.

The switching unit 32 outputs, as a selection signal SL, a signal indicating that the received radio wave is in the good state or in the bad state to the two units UA, UB. When the selection signal SL indicates that the received radio wave is in the good state, the unit UA stores the restored image IMGA in the external memory 22, and when the selection signal SL indicates that the received radio wave is the bad state, the unit UA stops the operation. Specifically, when the selection signal SL indicates that the received radio state is in the bad state, the image reproduction unit 33 stops the operation.

On the other hand, when the selection signal SL indicates that the received radio wave is in the bad state, the unit UB stores the drawn image IMGB in the external memory 22, and when the selection signal SL indicates that the received radio wave is in the good state, the unit UB stops at least the drawing operation by the GPU 35. In the example of FIG. 1, when the selection signal SL indicates that the received radio wave is in a bad state, the drawing control unit 30 stops the operation, and as a result, the drawing control unit 30 does not output a drawing start instruction GST to the GPU 35.

Here, a software processing unit 38 is configured by, for example, the drawing control unit 30, the wireless control unit 31, the switching unit 32, and the image reproduction unit 33. The software processing unit 38 is implemented by executing software stored in the internal memory 36 by a Central Processing Unit (CPU). However, it is not necessarily limited to such an implementation method. For example, the switching unit 32 may be implemented in dedicated hardware. Further the decoder 37 may be implemented by software processing in some cases.

The server apparatus 12 includes a drawing unit 40, an encoder 41, and a wireless device 42. The wireless device 42 performs wireless communication with the wireless device 24 of the terminal apparatus 10*a*. For example, the wireless device 42 receives transmitted radio wave TX from the wireless device 24 and outputs demodulated data including input information IN by demodulating the transmitted radio wave TX. The drawing unit 40 receives the demodulated data and acquires the input information IN included in the demodulated data. Then, the drawing unit 40 draws an image IMGA in accordance with the input information IN based on the acquired input information IN. The drawing unit 40 is implemented, for example, by software processing using a CPU of the server apparatus 12, or a combination of the software processing and hardware processing using a GPU or the like.

The encoder 41 encodes the image IMGA drawn by the drawing unit 40, and outputs the encoded image IMGAe. The encoder 41 is typically an MPEG encoder, a JPEG encoder, or the like. The wireless device 42 transmits the radio wave, that is, the received radio wave RX seen from the wireless device 24 to the wireless device 24, by modulating the image IMGAe from the encoder 41.

(Operation of Software Processing Unit)

Figure 2:
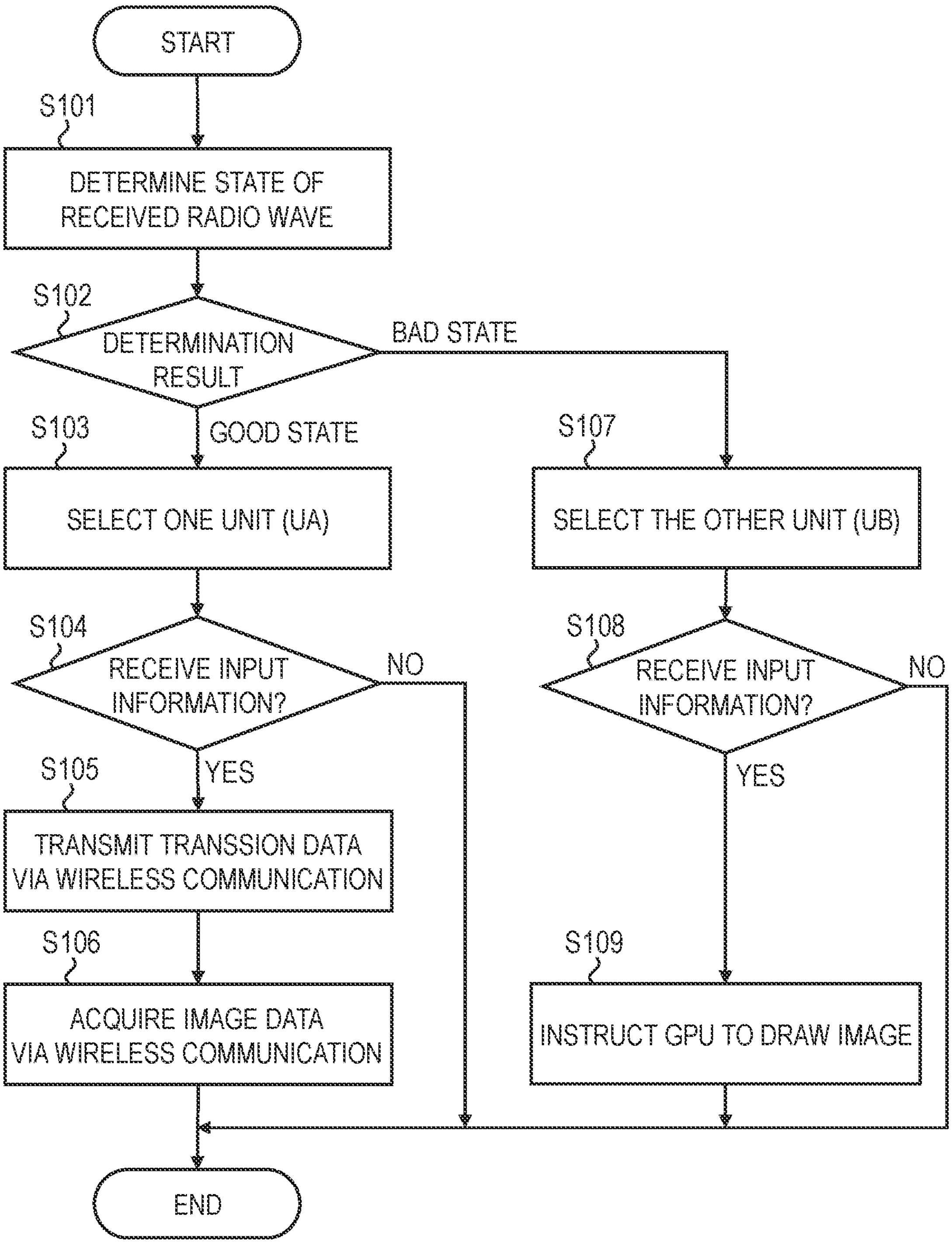
FIG. 2 is a flow diagram showing an example of processing performed by a software processing unit in a display control device in FIG. 1.

FIG. 2 is a flow diagram showing an example of processing performed by a software processing unit in a display control device in FIG. 1. At first, in a step S101, the switching unit 32 determines the state of the received radio wave RX based on the detection signal DET from the detector 23. In a step S102, when the determination result of the step S101 is that the received radio wave is in a good state, the processing of the switching unit 32 proceeds to a step S103.

In the step S103, the switching unit 32 selects one unit UA and cancels the selection of the other unit UB, using the selection signal SL. Subsequently, in steps S104 and S105, when receiving input information IN from the input interface 21, the wireless control unit 31 generates transmission data TD including the input information IN and transmits the transmission data TD to the server apparatus 12 via wireless communication. As a result, the wireless control unit 31 causes the server apparatus 12 to draw an image IMGA in accordance with the input information IN.

Thereafter, in a step 16, the image reproduction unit 33 in the selected unit UA acquires the image IMGA drawn by the server apparatus 12 via the wireless communication and displays the image IMGA on the display apparatus 16. It is noted that the software processing unit 38 ends the processing and then starts the processing of the step S101 again, when not receiving the input information IN from the input interface 21 in the step S104.

On the other hand, in the step S102, when the determination result of the step S101 is that the received radio wave is in a bad state, the processing of the switching unit 32 proceeds to a step S107. In the step S107, the switching unit 32 cancels the selection of one unit UA and selects the other unit UB, using the selection signal SL.

Subsequently, in steps S108 and S109, when receiving input information IN from the input interface 21, the drawing control unit 30 in the selected unit UB causes the GPU 35 to draw the image IMGB in accordance with the input information IN and displays the image IMGB drawn by the GPU 35 on the display apparatus 16. More specifically, the drawing control unit 30 outputs a drawing start instruction GST based on the input information IN to the GPU 35. It is noted that the software processing unit 38 ends the processing and then starts the processing of the step S101 again, when not receiving the input information IN from the input interface 21 in the step S108.

The image IMGA acquired in the step S106 and the image IMGB drawn in the step S109 may be, for example, an image representing the condition of the vehicle, or various images in accordance with the user's inputs. For example, the drawing control unit 30 receives the information of the input of the user as the input information IN, determines the contents of the image IMGB based on the input information IN, and outputs a drawing start instruction GST for drawing the determined image IMGB to the GPU 35.

In addition, the processing of the wireless control unit 31 in the step S105 may be executed in some cases regardless of the determination result in the steps S102. That is, the wireless control unit 31 may output the transmission data TD even if the determination result is that the received radio wave is in a bad state. For example, the wireless device 24 may stop the transmission of the transmitted radio wave TX when the intensity of the received radio wave RX does not satisfy the condition. In this case, even if the wireless control unit 31 outputs the transmission data TD, the transmission data TD is not transmitted to the server apparatus 12. Thus, when the determination result is that the received radio wave is in the bad state, by controlling the transmitted radio wave TX so that it is not transmitted by the wireless control unit 31 or the wireless device 24, the power consumption of the wireless device 24 and, by extension, the terminal apparatus 10*a* can be reduced.

Here, in particular, in the terminal apparatus 10*a* mounted on an electric vehicle or the like, the reduction of the power consumption is required. In such a case, in the display control device 15 of FIG. 1, by using the unit UA, there is a case that it is possible to reduce the power consumption as compared with the case of using the unit UB. For example, the magnitude of the power consumption when using the unit UA is mainly determined by the transmission operation of the transmitted radio wave TX by the wireless device 24. Thus, if the amount of information in the input information IN is sufficiently small, the power consumption at the wireless device 24 may be sufficiently smaller than the power consumption at the GPU 35.

For this reason, it is conceivable to mount only the unit UA in the display control device 15. However, in this case, a desired image cannot be displayed on the display apparatus 16 during a period in which the state of the wireless communication becomes bad. In particular, in a field where high safety is required, such as automobiles, a mechanism is required to display a desired image regardless of the state of wireless communication, in order to transmit appropriate information to a user at an appropriate timing. Therefore, it is useful to provide the unit UB, the switching unit 32, and the like, and to switch the two units UA, UB according to the state of the wireless communication, in particular, the state of the received radio wave RX.

When the two units UA, UB are switched, it is desirable to display the images IMGA, IMGB from the two units UA, UB on the display apparatusl6 without interruption. For this purpose, the operation of the drawing control unit 30 in the terminal apparatus 10*a* needs to be synchronized with the operation of the drawing unit 40 in the server apparatus 12. In the display control device 15 of FIG. 1, the drawing control unit 30 receives the input information IN, and the wireless control unit 31 also receives the same input information IN and transmits the same input information IN to the server apparatus 12, thereby realizing synchronization between the drawing control unit 30 and the drawing unit 40.

For example, in order to more reliably synchronize the drawing control unit 30 and the drawing unit 40 without being affected by the delay of the wireless communication or the like, the correspondence between the input information IN and the images IMGA, IMGB may be managed by a frame number. In this case, for example, the drawing control unit 30 and the wireless control unit 31 share the input information IN and the frame number associated with the input information IN.

Then, the wireless control unit 31 transmits the transmission data TD including the input information IN and the frame number to the server apparatus 12. In response to this, the server apparatus 12 returns, to the terminal apparatus 10a, the image IMGA in accordance with the input information IN, together with the frame number of the input information IN. By using such a control method, when the two units UA, UB are switched, images to be displayed next can be correctly discriminated on the basis of the frame numbers.

(Main Effect of First: Embodiment)

As described above, in the system of the first embodiment, by providing the two units UA, UB and the switching unit 32 that selects one of the two units UA, UB in accordance with the state of the received radio wave RX, a desired image can be displayed on the display apparatus 16 regardless of the state of the wireless communication. In addition, in a period in which the state of the wireless communication is good, the power consumption of the terminal apparatus 10*a* can be reduced by selecting the unit UA.

Second Embodiment (Outline of Terminal Apparatus)

Figure 3:
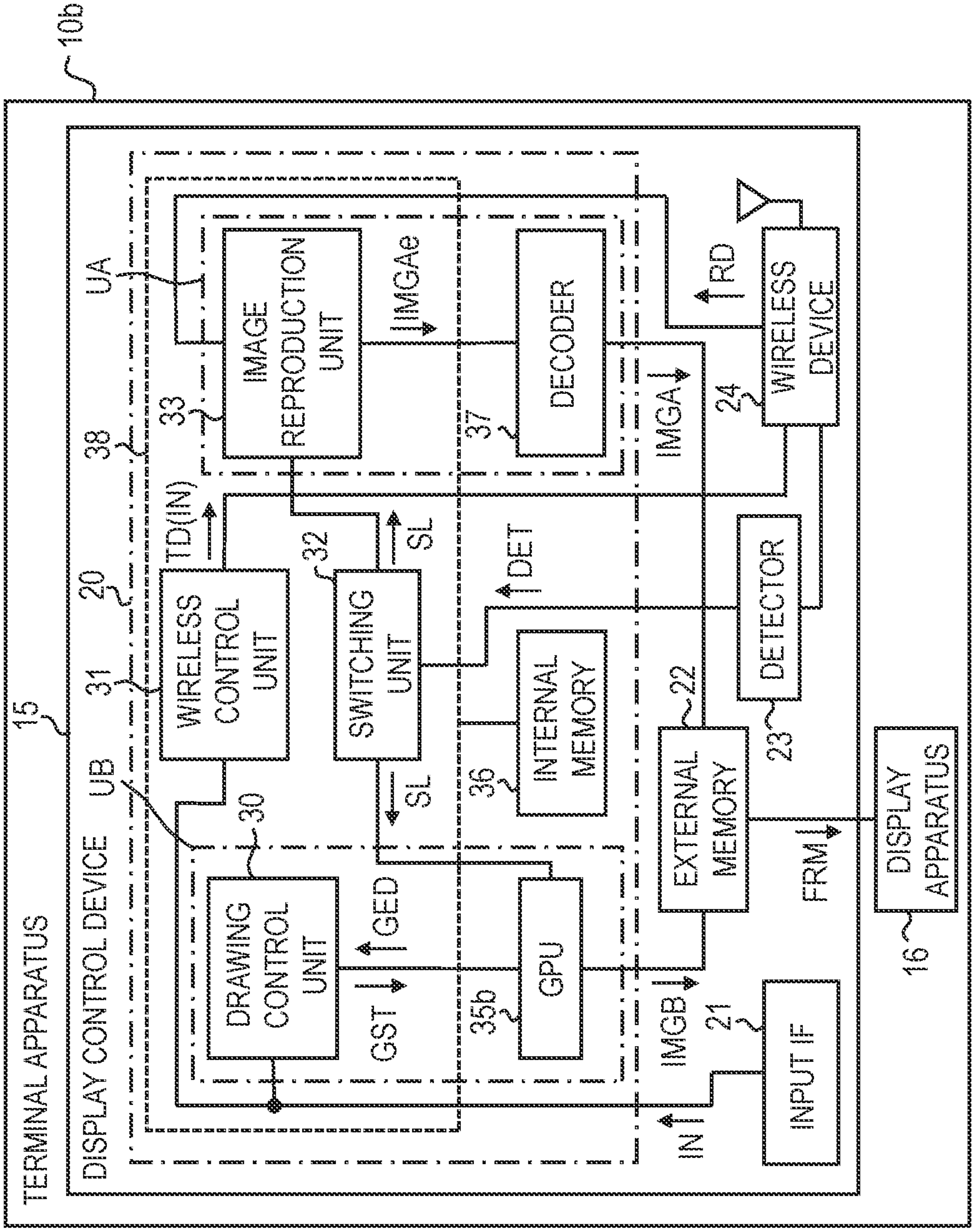
FIG. 3 is a schematic diagram showing a configuration example of a main part of a terminal apparatus according to the second embodiment.

FIG. 3 is a schematic diagram showing a configuration example of a main part of a terminal apparatus according to the second embodiment. A terminal apparatus 10*b* shown in FIG. 3 differs from the terminal apparatus 10*a* shown in FIG. 1 in an output destination of the switching unit 32, a configuration of a GPU 35*b*, and an operation of the GPU 35*b*. The switching unit 32 outputs the selection signal SL to the GPU 35*b* instead of the drawing control unit 30. When the unit UA is selected by the selection signal SL from the switching unit 32, the GPU 35*b* ignores the drawing start instruction GST from the drawing control unit 30.

Specifically, the GPU 35*b* includes, for example, a circuit for switching whether or not to ignore the drawing starting instruction GST in response to the selection signal SL from the switching unit 32. It is noted that, when the unit UB is selected by the selection signal SL from the switching unit 32, the GPU 35*b* draws the image IMGB in response to the drawing start instruction GST from the drawing control unit 30 as usual.

By using such a configuration, for example, the drawing control unit 30 does not need to switch whether to output the drawing start instruction GST based on the selection signal SL. That is, the drawing control unit 30 operates so as not to be different from the period in which the unit UB is selected, even during the period in which the unit UA is selected. On the other hand, in the configuration example shown in FIG. 1, the drawing control unit 30 needs to change the operation between the period in which the unit UA is selected and the period in which the unit UB is selected. As a typical implementation method, there is a method of invalidating the operation of the drawing control unit 30 during a period in which the unit UA is selected.

However, in this case, it may be difficult to cope with a case where a stateful process is required, such as, for example, defining an image to be displayed based on a series of input information IN. As a specific example, it is assumed that the unit UA is switched to the unit UB during execution of stateful processing. In this case, in the configuration example shown in FIG. 1, since the drawing control unit 30 is activated, for example, at the time of switching, it is difficult to grasp the processing of the unit UA at the previous time.

On the other hand, using the configuration example of FIG. 3, since the drawing control unit 30 continues to operate regardless of whether or not there is a switch, it is possible to grasp the processing of the unit UA. As a result, the drawing control unit 30 can take over the processing of the unit UA while maintaining the consistency even when the unit UB is switched in the middle of executing the stateful processing using the unit UA. Similarly, the switching from the unit UB to the unit UA can be maintained in consistency by always operating the wireless control unit 31.

(Main Effect of Second Embodiment)

As described above, even by using the method of the second embodiment, the same effects as the various effects described in the first embodiment can be obtained. In addition, the two units UA, UB can be switched while maintaining consistency.

Third Embodiment (Outline of Terminal Apparatus)

Figure 4:
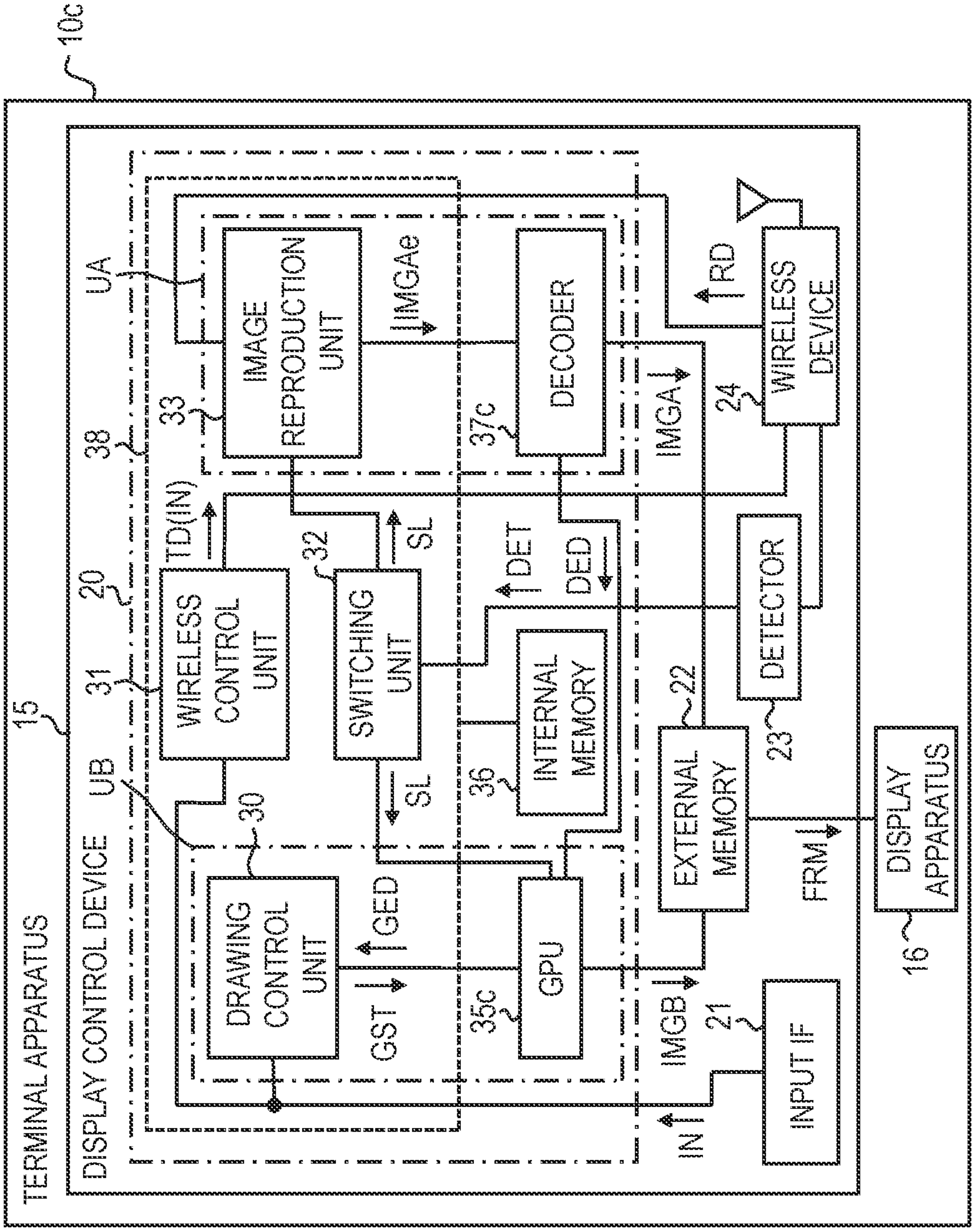
FIG. 4 is a schematic diagram showing a configuration example of a main part of a terminal apparatus according to the third embodiment.

FIG. 4 is a schematic diagram showing a configuration example of a main part of a terminal apparatus according to the third embodiment. A terminal apparatus 10*c* shown in FIG. 4 differs from the terminal apparatus 10*b* shown in FIG. 3 in configurations of a decoder 37*c* and a GPU 35*c*, and an operation of the GPU 35*c*. The decoder 37*c* outputs a decode end notification DED when decoding is completed. Specifically, the decoder 37*c* includes a circuit for outputting the decode end notification DED.

When the unit UA is selected by the selection signal SL from the switching unit 32, the GPU 35*c* outputs a drawing end notification GED to the drawing control unit 30 in response to the decode end notification DED from the decoder 37*c* after ignoring the drawing start instruction GST from the drawing control unit 30. More specifically, the GPU 35*c* includes a circuit for receiving the decode end notification DED and outputting the drawing end notification GED.

(Operation of Terminal Apparatus)

Figure 5A:
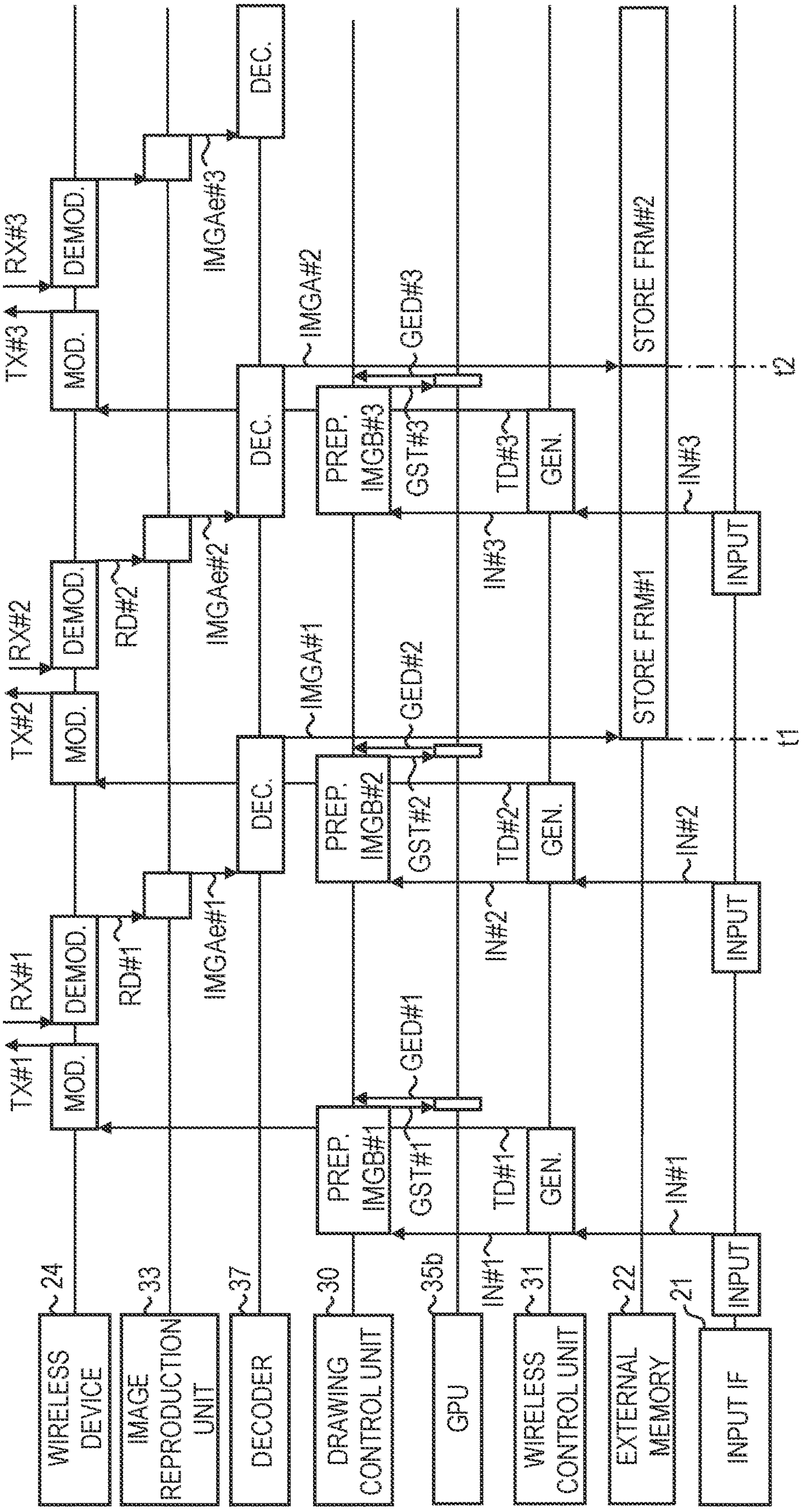
FIG. 5A is a timing chart showing an example of an operation that may occur when the configuration example of FIG. 3 is used as a premise of the terminal apparatus of FIG. 4.

FIG. 5A is a timing chart showing an example of an operation that may occur when the configuration example of FIG. 3 is used as a premise of the terminal apparatus of FIG. 4. In FIG. 5A, it is assumed that the state of the wireless communication is good and the unit UA including the image reproduction unit 33 and the like is selected. As shown in FIG. 5A, at first, the input interface 21 outputs input information IN #1 for requesting an image #1 to the drawing control unit 30 and the wireless control unit 31. The drawing control unit 30 receives the input information IN #1, prepares the GPU 35*b* to draw the image IMGB #1 in accordance with the input information IN #1, and then outputs a drawing start instruction GST #1 to the GPU 35*b*.

Here, as described with reference to FIG. 3, the GPU 35*b* ignores the drawing start instruction GST #1 and does not perform drawing. Therefore, the GPU 35*b* does not output a drawing end notification GED #1 as it is. However, in general, in the image processing using the GPU, the drawing control unit 30 implemented by the CPU needs to wait for a drawing end notification GED from the GPU when outputting a drawing start instruction GST to the GPU. In addition, after receiving a drawing end notification GED from the GPU, the drawing control unit 30 needs to output a drawing start instruction GST for the next image to the GPU.

As a typical method for satisfying such requests, in the example of FIG. 5A, the GPU 35*b* receives the drawing start instruction GST #1 from the drawing control unit 30, and then immediately outputs the drawing end notification GED #1 to the drawing control unit 30. That is, a circuit for outputting such a drawing end notification GED #1 is provided in the GPU 35*b*.

Meanwhile, the wireless control unit 31 receives the input information IN #1 in parallel with the drawing control unit 30, generates transmission data TD #1 including the input information IN #1, and outputs the transmission data TD #1 to the wireless device 24. The wireless device 24 transmits a transmitted radio wave TX #1 generated by modulating the transmission data TD #1 to the server apparatus 12 (not shown). In response to this, the wireless device 24 receives a received radio wave RX #1 from the server apparatus 12. The wireless device 24 outputs a reception data RD #1 including an encoded image IMGAe #1 to the image reproduction unit 33 by demodulating the received radio wave RX #1.

The image reproduction unit 33 receives the reception data RD #1 and acquires the image IMGAe #1 included in the reception data RD #1. Then, the image reproduction unit 33 causes the decoder 37 to decode the encoded image IMGAe #1. Consequently, the decoder 37 restores the original image IMGA #1 and stores the image IMGA #1 as frame data FRM #1 in the external memory 22. It can be said that the time t1 when the image IMGA #1 is stored in the external memory 22 is substantially the time when the drawing of the image #1 in response to the request is completed.

Here, in the example of FIG. 5A, at a time prior to the time t1, the input interface 21 outputs input information IN #2 for requesting the next image #2. The same processing as in the case of the input information IN #1 is sequentially performed for the input information IN #2. At this time, prior to receiving the input information IN #2, the drawing control unit 30 has already received the drawing end notification GED #1 for the image #1 from the GPU 35*b*. Therefore, upon receiving the input information IN #2, the drawing control unit 30 immediately starts preparations for causing the GPU 35*b* to draw an image IMGB #2 in accordance with the input information IN #2.

As a result, as shown in FIG. 5A, the GPU 35*b* may output a drawing end notification GED #2 for the image #2 to the drawing control unit 30 at a time prior to the time t1. This means that the drawing of the next requested image #2 is completed before the time t1 when the drawing of the requested image #1 is completed.

As described above, in the operation example of the FIG. 5A, the order of images to be drawn may not be synchronized between the unit UA and the unit UB. As a result, when the switching unit 32 switches between the two units UA, UB, there is a possibility that the order of the displayed images is shifted. Therefore, as in the configuration example of FIG. 4, it is useful to provide a decode end notification DED.

Figure 5B:
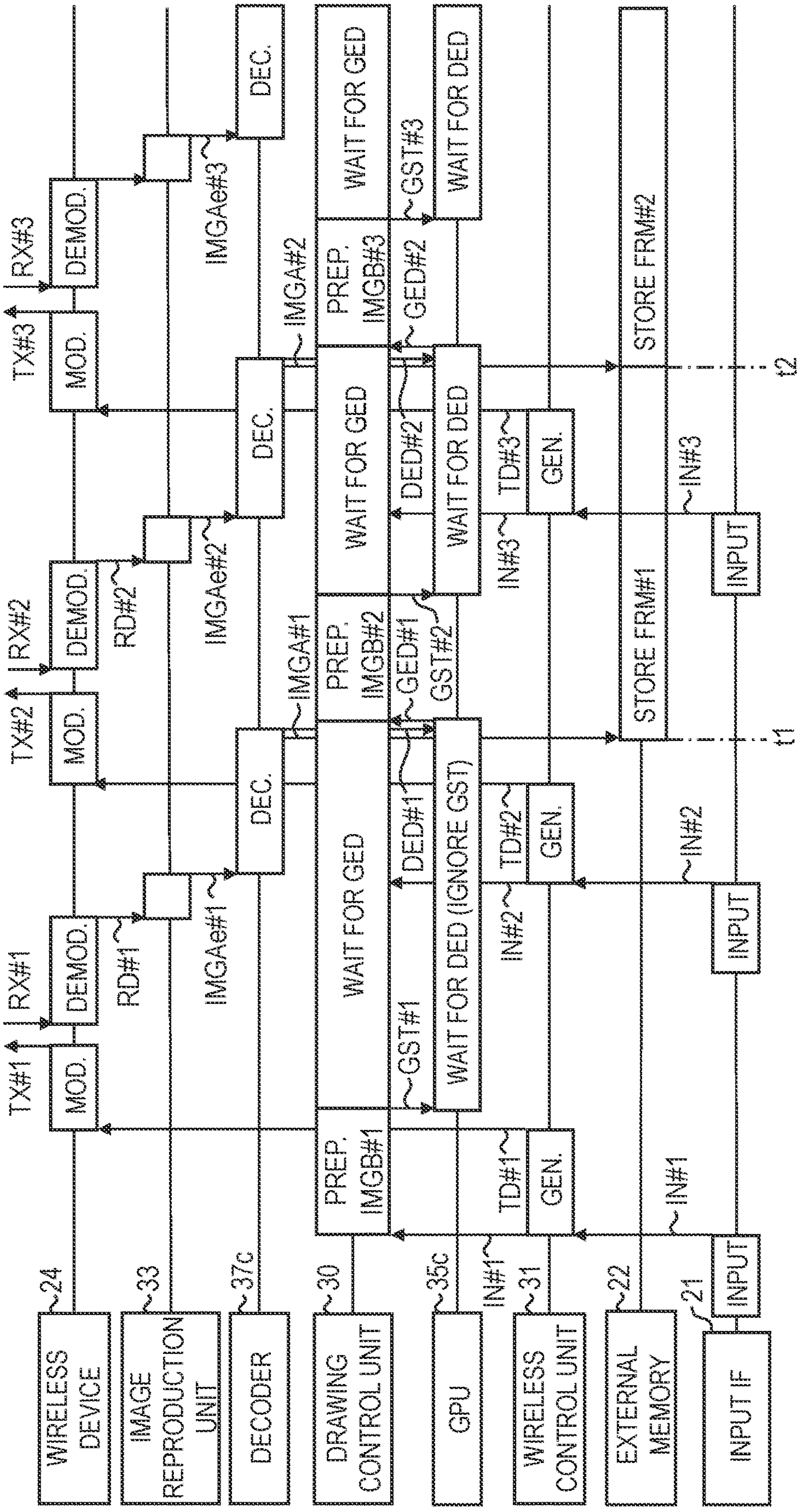
FIG. 5B is a timing chart showing an example of an operation when the terminal apparatus of FIG. 4 is used.

FIG. 5B is a timing chart showing an example of an operation when the terminal apparatus of FIG. 4 is used. In FIG. 5B, as in the case of FIG. 5A, the unit UA finishes drawing the requested image #1 at the time t1. Further, as in the case of FIG. 5A, at a time prior to the time t1, the input interface 21 outputs the input information IN #2 for requesting the next image #2.

However, in FIG. 5B, unlike in the case of FIG. 5A, the GPU 35*c* outputs a drawing end notification GED #1 for the same image #1 to the drawing control unit 30 at substantially the same time as the time t1 at which the unit UA finishes drawing the image #1. Similarly, the GPU 35*c* outputs a drawing end notification GED #2 for the same image #2 to the drawing control unit 30 at substantially the same time as the time t2 at which the unit UA finishes drawing the image #2.

Specifically, for example, the GPU 35*c* receives a drawing start instruction GST #1 for the image #1 from the drawing control unit 30, and then waits for a decode end notification DED #1 from the decoder 37*c*. When receiving the decoding end notification DED #1, the GPU 35*c* outputs a drawing end notification GED #1 to the drawing control unit 30. As a result, the time t1 at which the drawing of the requested image #1 is finished can be made substantially equal between the two units UA, UB. As a result, the order of images to be drawn can be synchronized between the two units UA, UB.

The drawing control unit 30 outputs the drawing start instruction GST #1 for the image #1 to the GPU 35*c*, and then waits for the drawing end notification GED #1 from the GPU35C. The drawing control unit 30 holds input information IN #2 received during the period of waiting for the drawing end notification GED #1 in the internal memory 36, a register, or the like. Then, the drawing control unit 30 starts preparations for causing the GPU 35C to draw the next image IMGB #2 in accordance with the input information IN #2 from the time when receiving the drawing end notification GED #1 from the GPU 35*c*. This allows the CPU and GPU to operate in a general operating method.

Figure 5C:
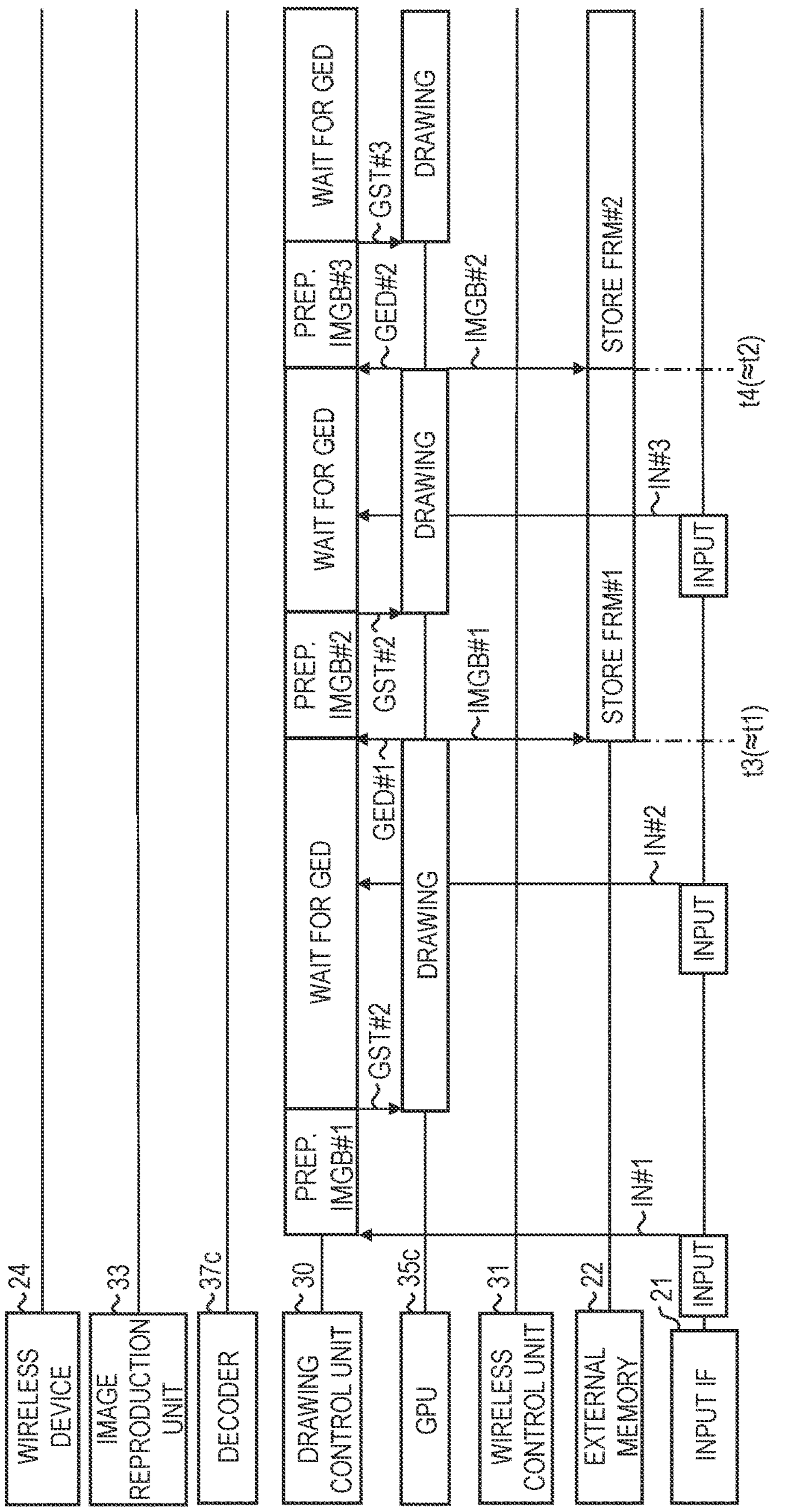
FIG. 5C is a timing chart showing an example of an operation different from the operation shown in FIG. 5B when the terminal apparatus of FIG. 4 is used.

FIG. 5C is a timing chart showing an example of an operation different from the operation shown in FIG. 5B when the terminal apparatus of FIG. 4 is used. Unlike FIG. 5B, FIG. 5C shows an operation example when the state of the wireless communication is bad. In FIG. 5C, unlike FIG. 5B, the operations of the wireless device 24, the image reproduction unit 33, and the decoder 37*c* are stopped. In addition, unlike FIG. 5B, the GPU 35*c* does not ignore a drawing start instruction GST #1 from the drawing control unit 30, for example, but actually draws the image IMGB #1 in response to the drawing start instruction GST #1.

The GPU 35*c* outputs a drawing end notification GED #1 to the drawing control unit 30 and stores the drawn image IMGB#1 as a frame data FRM #1 in the external memory 22 at the time t3 when the drawing of the image IMGB #1 is completed. This time t3 depends on the relative relation between the drawing time in the GPU 35*c* and the time required from the time of instructing the server apparatus 12 to draw the image to the time of completing the restoration of the image, but it can generally be a time close to the time t1 shown in FIG. 5B.

(Main Effect of Third Embodiment)

As described above, even by using the method of the third embodiment, the same effects as the various effects described in the first and second embodiments can be obtained. In addition, the order of images to be drawn can be synchronized between the two units UA, UB. As a result, when the switching between the two units UA, UB occurs, the order of images to be displayed can be accurately maintained.

Although the invention made by the present inventor has been specifically described based on the embodiment, the present invention is not limited to the embodiment described above, and various modifications can be made without departing from the gist thereof. For example, the foregoing embodiments have been described in detail for the purpose of illustrating the present invention easily and are not necessarily limited to those comprising all the configurations described. In addition, a part of the configuration of one embodiment can be replaced with the configuration of another embodiment, and the configuration of another embodiment can be added to the configuration of one embodiment. It is also possible to add, delete, or replace some of the configurations of the respective embodiments.

What is claimed is:

1. A display control device which performs wireless communication with an external apparatus and displays an image in accordance with input information on a display apparatus, the display control device comprising:

a wireless control unit configured to i) transmit the input information to the external apparatus via the wireless communication and ii) cause the external apparatus to draw a first image in accordance with the input information;

a first unit including an image reproduction unit and a decoder, wherein the image reproduction unit is configured to acquire, via the wireless communication, the first image encoded after being drawn by the external apparatus, the decoder is configured to decode the acquired first image, and wherein the first unit is configured to display the first image on the display apparatus;

a second unit including a drawing control unit and a Graphics Processing Unit (GPU), wherein the drawing control unit is configured to output a drawing start instruction based on the input information, wherein the GPU is configured to draw a second image in response to the drawing start instruction, and wherein the second unit is configured to display the second image drawn by the GPU on the display apparatus; and a switching unit which is configured to determine whether a received radio wave is in a good state or a bad state, select the first unit when a determination result is that the received radio wave is in the good state, and select the second unit when the determination result is that the received radio wave is in the bad state, wherein the decoder of the first unit is configured to output a decode end notification when decoding of the first image is completed, wherein the drawing control unit is configured to output the drawing start instructions to the GPU even when the first unit is selected by the switching unit, and wherein, when the first unit is selected by the switching unit, the GPU of the second unit is configured to 1) ignore the drawing start instruction from the drawing control unit and 2) output a drawing end notification to the drawing control unit in response to i) ignoring the drawing start instruction from the drawing control unit and ii) receiving the decode end notification from the decoder.

2. The display control device according to claim 1, further comprising:

an input interface which is configured to receive an input from a user and to generate the input information;

a wireless device which is configured to perform the wireless communication with the external apparatus; and wherein a detector which is configured to detect a state of the received radio wave.

3. A display control device which performs wireless communication with an external apparatus and displays an image in accordance with input information on a display apparatus, the display control device comprising:

a Central Processing Unit (CPU); and a Graphics Processing Unit (GPU), wherein the CPU is configured to:

cause the external apparatus to draw a first image in accordance with the input information by transmitting the input information to the external apparatus via the wireless communication;

determine whether a received radio wave is in a good state or a bad state;

when a determination result is that the received radio wave is in the good state, acquire the first image drawn by the external apparatus via the wireless communication, and display the first image on the display apparatus; and when the determination result is that the received radio wave is in the bad state, cause the GPU to draw a second image in accordance with the input information and display the second image drawn by the GPU on the display apparatus, wherein the CPU is configured to output a drawing start instruction to the GPU even when the determination result is that the received radio wave is in the good state, wherein, when the determination result is that the received radio wave is in the good state, the GPU is configured to ignore the drawing start instruction from the CPU, wherein the display control device further comprises a decoder which is configured to decode the first image encoded after being drawn by the external apparatus, wherein the decoder is configured to output a decode end notification when decoding is completed, and wherein, when the determination result is that the received radio wave is in the good state, the GPU is configured to output a drawing end notification to the CPU in response to the decode end notification from the decoder after ignoring the drawing start instruction from the CPU.

4. The display control device according to claim 3, further comprising:

an input interface which is configured to receive an input from a user and to generate the input information;

a wireless device which is configured to perform the wireless communication with the external apparatus; and wherein a detector which is configured to detect a state of the received radio wave.

5. The display control device according to claim 1, wherein the input information comprises first input information, and wherein the drawing control unit is configured to:

receive second input information during a period of waiting for the drawing end notification from the GPU after outputting the drawing start instruction to the GPU; and start preparations for causing the GPU to draw a next image in accordance with the second input information in response to the drawing end notification.

6. The display control device according to claim 1, wherein the display control device and the display apparatus are mounted on a vehicle, and wherein the external apparatus comprises a server apparatus.

7. The display control device according to claim 3, wherein the input information comprises first input information, and wherein the GPU is configured to:

receive second input information during a period of waiting for the drawing end notification from the GPU after outputting the drawing start instruction to the GPU; and start preparations for causing the GPU to draw a next image in accordance with the second input information in response to the drawing end notification.

8. The display control device according to claim 3, wherein the display control device and the display apparatus are mounted on a vehicle, and wherein the external apparatus comprises a server apparatus.

* * * * *